United States Patent
Furushige et al.

(10) Patent No.: US 9,503,602 B2
(45) Date of Patent: Nov. 22, 2016

(54) IMAGE FORMING APPARATUS, IMAGE FORMATION METHOD, AND RECORDING MEDIUM THAT EXECUTE APPLICATION

(71) Applicant: KYOCERA Document Solutions Inc., Osaka (JP)

(72) Inventors: Katsuji Furushige, Osaka (JP); Minoru Takahashi, Osaka (JP); Takashi Murakami, Osaka (JP); Makoto Kowaka, Osaka (JP); Tomonori Naota, Osaka (JP); Ayaka Ikejima, Osaka (JP); Masato Hirota, Osaka (JP); Kyota Mitsuyama, Osaka (JP); Wataru Tsukuda, Osaka (JP); Yosuke Nakazato, Osaka (JP); Daijiro Kitamoto, Osaka (JP); Koji Ikawa, Osaka (JP); Satoshi Imai, Osaka (JP); Tomihito Doi, Osaka (JP); Kentaro Okamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/747,430

(22) Filed: Jun. 23, 2015

(65) Prior Publication Data
US 2015/0373223 A1    Dec. 24, 2015

(30) Foreign Application Priority Data

Jun. 23, 2014   (JP) ................................ 2014-128381

(51) Int. Cl.
*H04N 1/00* (2006.01)

(52) U.S. Cl.
CPC ...... *H04N 1/00938* (2013.01); *H04N 1/00347* (2013.01); *H04N 1/00973* (2013.01); *H04N 2201/0094* (2013.01)

(58) Field of Classification Search
CPC .................... H04N 1/00938; H04N 1/00347; H04N 2201/0094
See application file for complete search history.

(56) References Cited

U.S. PATENT DOCUMENTS

| | | | | |
|---|---|---|---|---|
| 2002/0054326 | A1* | 5/2002 | Morita ...................... | G06F 8/60 358/1.15 |
| 2009/0296150 | A1* | 12/2009 | Shudo ................ | H04N 1/00973 358/1.15 |
| 2011/0103819 | A1* | 5/2011 | Sekiya ............... | G03G 15/5075 399/81 |

FOREIGN PATENT DOCUMENTS

JP    2002-084383 A    3/2002

* cited by examiner

*Primary Examiner* — Iriana Cruz
(74) *Attorney, Agent, or Firm* — Hawaii Patent Services; Nathaniel K. Fedde; Kenton N. Fedde

(57) ABSTRACT

Provided is the image forming apparatus, image formation method, and recording medium, which make unnecessary a change of the function in the side of a whole apparatus control platform, when the addition (extension) of the function of application is needed. Image processing service I/F, device operation service I/F, and network communication service I/F of a platform service I/F part are independent, without cooperating, respectively. Then, image processing service, device operation service, and network communication service of each part controlling service are called. That is calling a control service providing part of each part controlling service corresponding to the request from the standard application, directly, by each control service call part.

12 Claims, 8 Drawing Sheets

IMAGE FORMING APPARATUS, IMAGE FORMATION METHOD, AND RECORDING MEDIUM THAT EXECUTE APPLICATION

INCORPORATION BY REFERENCE

This application is based on and claims the benefit of priority from Japanese Patent Application No. 2014-128381 filed on Jun. 23, 2014, the contents of that are hereby incorporated by reference.

BACKGROUND

The present disclosure relates to an image forming apparatus, an image formation method, and a recording medium, and is especially related with an image forming apparatus, an image formation method, and a recording medium that execute application software.

Some image forming apparatuses, such as an MFP (Multifunctional Peripheral) and a printer, which can print a document and an image, can install and execute various applications (Application Software.)

In addition, some applications may have additional function, such as a PDF generation, card management, and book management. Also, some applications may allow to have cooperation with an apparatus, such as a camera.

Incidentally, in order to install and execute such applications, it is necessary to develop each application so that the fundamental function of OS (Operating System) equipped in the image processing device can be used. Also, when developing application, it is also necessary to carry out efficiently so that high development cost may not be need.

To solve such a subject, a typical case of the image forming apparatus is proposed. In the case, a common part of each application is taken out as application service and common system service. Then, a platform is formed by the application service, common system service, and a versatile OS. On the platform, a printer application, a copy application, and various applications are equipped.

SUMMARY

An image forming apparatus according to an embodiment of the present disclosure is provided with a control circuit. The control circuit includes: an apparatus control platform that manages hardware resources on an operating system; a standard-application execution part that executes a standard application using the hardware resources managed on the appliance control platform; an extended application platform that includes standard function service for making use function of the standard application executed by the standard-application executing part, extended function service for making use the hardware resources, and an extended application management part for managing and executing an extended application to allow calling the standard function service and the extended function service, respectively; wherein the apparatus control platform includes a platform service interface part that provides an interface for using the hardware resources from outside of the apparatus control platform, and each part controlling service that has a plurality of control service providing part for providing service for controlling the hardware resources; the platform service interface part has a plurality of control service call part for determining a request from the standard application and for calling the control service providing part of each part controlling service corresponding to the request; and each control service call part calls a control service providing part of each part controlling service corresponding to the request from the standard application, directly.

An image formation method according to an embodiment of the present disclosure executed by an image forming apparatus having hardware resources includes: managing hardware resources on an operating system by an apparatus control platform; executing a standard application using the hardware resources managed on the apparatus control platform by standard-application executing part; managing and executing standard function service to make use function of the standard application executed by the standard-application executing part, extended function service to make use the hardware resources, and an extended application to allow calling the standard function service and the extended function service, respectively, by an extended application management part included on an extended application platform, wherein the apparatus control platform includes: providing an interface for using the hardware resources from outside of the apparatus control platform by a platform service interface part; and providing service for controlling the hardware resources by each part controlling service having a plurality of control service providing part, and wherein the platform service interface part includes: determining a request from the standard application by a plurality of control service call part; and calling a control service providing part of each part controlling service corresponding to the request from the standard application, directly, by each control service call part.

An computer readable non-transitory recording medium according to an embodiment of the present disclosure stores an image formation program executable by a computer for controlling an image forming apparatus, the image formation program causing the computer to: manage hardware resources on an operating system by an apparatus control platform; execute a standard application using the hardware resources managed on the apparatus control platform by standard-application executing part; manage and executing standard function service to make use function of the standard application executed by the standard-application executing part, extended function service to make use the hardware resources, and an extended application to allow calling the standard function service and the extended function service, respectively, by an extended application management part included on an extended application platform, wherein the apparatus control platform includes: providing an interface for using the hardware resources from outside of the apparatus control platform by a platform service interface part; and providing service for controlling the hardware resources by each part controlling service having a plurality of control service providing part, and wherein the platform service interface part includes: determining a request from the standard application by a plurality of control service call part; and calling a control service providing part of each part controlling service corresponding to the request from the standard application, directly, by each control service call part.

DETAILED DESCRIPTION

<Embodiment>

[The system configuration of image forming apparatus 1]

Figure 1:
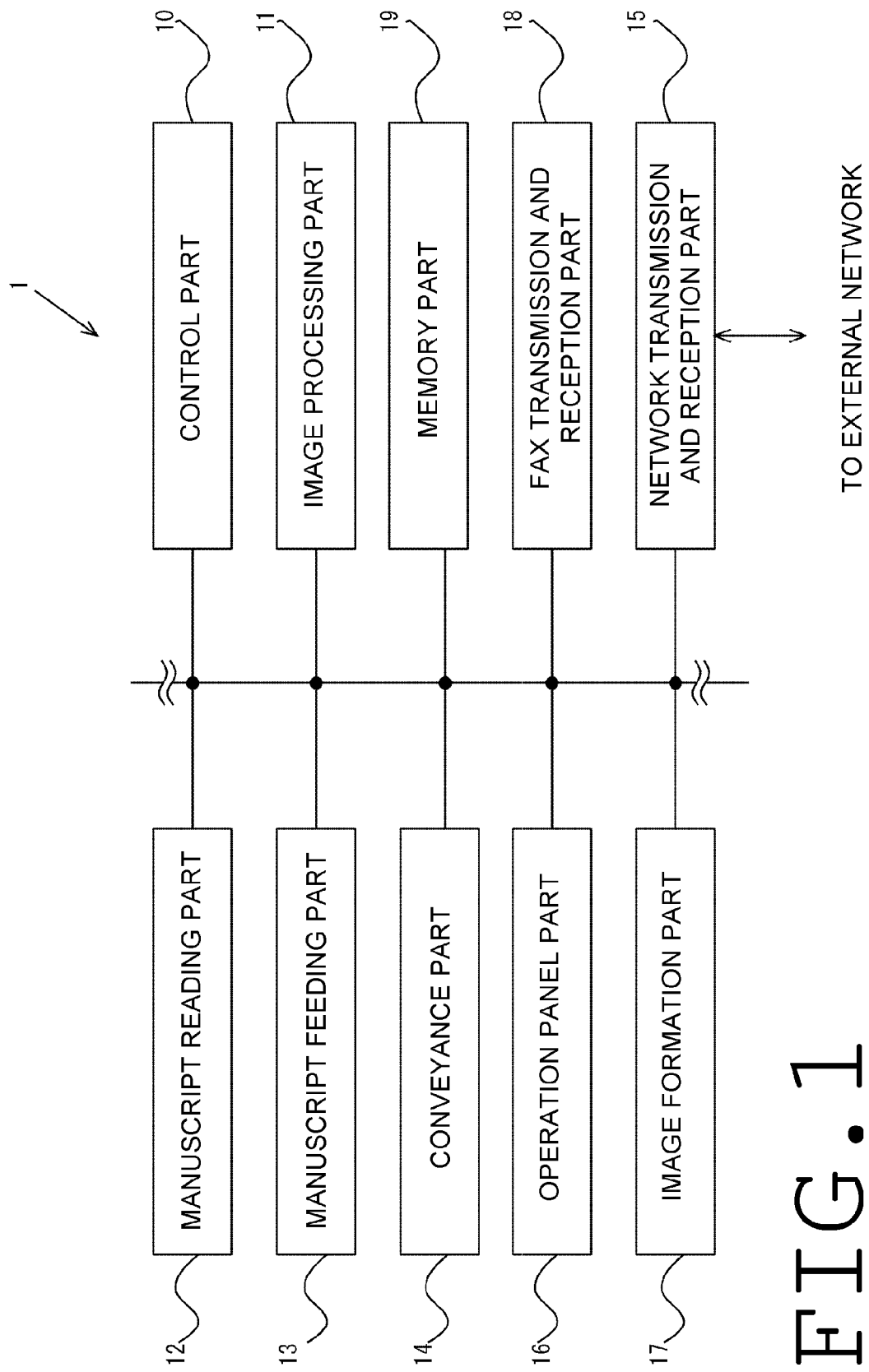
FIG. 1 illustrates a system configuration of an image forming apparatus related to the present embodiment.

Then, as refer to FIG. 1, the system configuration of image forming apparatus 1 is described. In addition, in the following explanation, an "application" is application software. In image forming apparatus 1, image processing part 11, manuscript reading part 12, manuscript feeding part 13, conveyance part 14, network transmission and reception part 15, operation panel part 16, image formation part 17, FAX transmission and reception part 18, and the memory part 19, or the like, are connected to control part 10. Each part is operation-controlled by control part 10.

Control part 10 is an information processing circuit. Control part 10 reads a control program memorized in memory part 19, expands and executes the control program, and thereby operates as each part of functional blocks as described later. Also, control part 10 controls a whole device according to instructions information input from an external terminal or operation panel part 16.

Image processing part 11 is a control and arithmetic circuit. Image processing part 11 carries out specific image processing to various kinds of image data. Image processing part 11 performs various image processing, such as scaling, density control, gradation adjustment, and an image improvement, for example. Image processing part 11 memorizes an image read by manuscript reading part 12 as print data in memory part 19. In this case, image processing part 11 can also convert the print data into a file unit.

Manuscript reading part 12 is a circuit that reads a set manuscript. Manuscript feeding part 13 is a mechanism in which the manuscript read by manuscript reading part 12 is conveyed. Conveyance part 14 is a mechanism that conveys a recording paper from a sheet paper cassette, performs image formation by image formation part 17, and conveys to a stack tray after that. Image formation part 17 is a circuit to perform the image formation from the data to the recording paper. By output instruction by a user, the data is memorized in memory part 19, is read by manuscript reading part 12, or is acquired from an external terminal.

Network transmission and reception part 15 is a network connection circuit for connecting with an external network. Network transmission and reception part 15 transmits and receives data in a data communication line. Network transmission and reception part 15 transmits and receives a sound signal in a voice telephone line. Network transmission and reception part 15 may be connected with the terminal in outside, such as PC (Personal Computer), a smart phone, a PDA (Personal Data Assistant), and a mobile phone, a server, or the like, via the network.

Operation panel part 16 is a circuit having a display part and an input part. The input part includes various buttons, a touch panel, or the like. The various buttons are a numeric keypad, a start, cancel, and a button for switching of operational mode, a button for performing instructions related to execution of a job, or the like. The button for switching of operational mode changes operational modes, such as a copy, FAX transmission, and a scanner. The button for performing instructions related to execution of a job acquires instructions related to execution of the job, such as printing, transmission, memory, record, or the like, for a selected document. Operation panel part 16 acquires a user instruction. The user instruction includes an instruction of installation or use for extended application 400 (FIG. 2) (Application Software, application,) as described later. Also, by the user instruction, each user information can be input and changed. Therefore, operation panel part 16 may have a control part, a recording media, such as ROM and RAM, for exclusive use, cooperate with control part 10, and controls GUI (Graphical User Interface.) The details of control of operation panel part 16 at the time of installation or use of extended application 400 are described later. Also, operation panel part 16 may have a connecting part in order to connect a recording medium, such as a USB memory and flash memory card, or an external apparatus equipped with a recording medium.

FAX transmission and reception part 18 is a circuit, such as a FAX board that transmits and receives a facsimile. FAX transmission and reception part 18 renders the image data read by manuscript reading part 12, the file received from network transmission and reception part 15, or the like, and performs facsimile transmission. Also, FAX transmission and reception part 18 performs image formation of the image data by image formation part 17. The image data has been memorized in memory part 19 or performed facsimile reception. Also, FAX transmission and reception part 18 transmits the image data to the external terminal from network transmission and reception part 15.

Memory part 19 is a circuit including a non-transitory recording medium and a controller. In memory part 19, the control program and data for operation-controlling image forming apparatus 1 are memorized. The control programs and data may be provided in a type, such as firmware. Also, the control program and data are expanded in run time, and control part 10 executes. Also, in memory part 19, various job data, image data scanned by manuscript reading part 12, image data performed image processing by image processing part 11, various files, such as print documents transmitted from other terminals, various files read from the connected recording medium, a data of a thumbnail image, or the like, may be memorized. Also, memory part 19 may memorize an account setup of a user. Also, in memory part 19, area of a document box for each user may be included.

In addition, as for image forming apparatus 1, control part 10 and image processing part 11 may be integrally formed. Also, control part 10 and image processing part 11 may integrate the non-transitory recording medium.

[The Control Configuration of Image Forming Apparatus 1]

Figure 2:
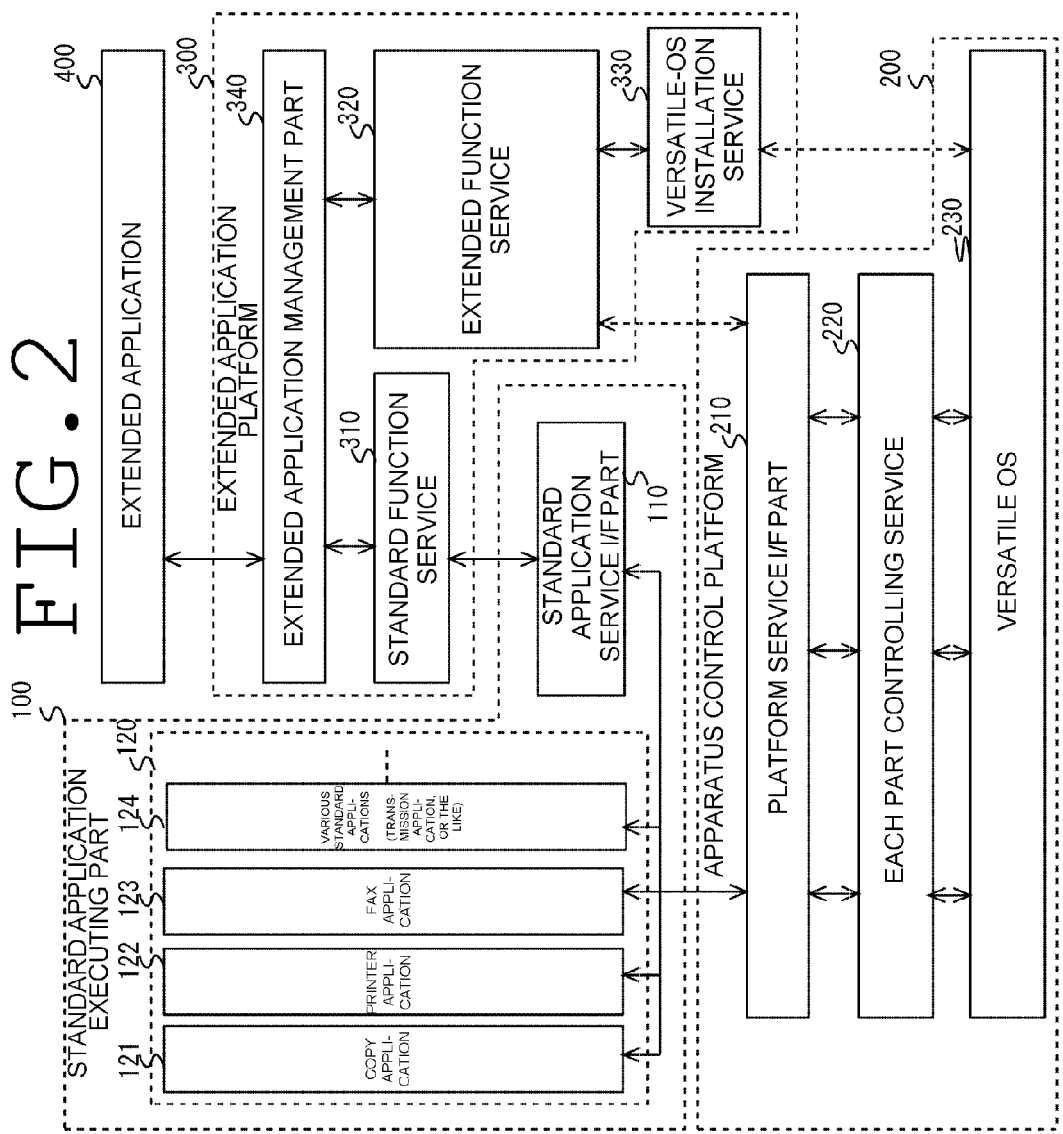
FIG. 2 illustrates a control configuration of the image forming apparatus shown in FIG. 1.

Then, referring to FIG. 2, a control configuration of image forming apparatus 1 is described. As three hierarchical block structures, image forming apparatus 1 has standard application executing part 100, apparatus control platform 200, extended application platform 300, and extended application 400. By control part 10 executing the control program of the present disclosure, standard application executing part 100, apparatus control platform 200, and extended application platform 300 are realized on the circuit of control part 10. Further, based on the control configuration shown in FIG. 2, control part 10 can execute extended application 400, standard application 120, and versatile OS 230.

Standard application executing part 100 is a circuit that executes standard application 120 by using hardware resources managed on apparatus control platform 200. Standard application executing part 100 has standard application 120 installed on apparatus control platform 200 and service corresponding to the standard application 120.

Apparatus control platform 200 manages the hardware resources of image forming apparatus 1 as a whole on versatile OS (Operating System) 230. Apparatus control platform 200 is a circuit that controls each part by a functional processing module. Apparatus control platform 200 is a program and data that becomes an executing framework of standard application 120 and includes API (Application Programming Interface,) middleware, run time data, a linker, or the like (hereinafter, it is called "API, or the like,") service on versatile OS 230 (service or daemon, and hereinafter it is called "service or the like,") interpreter, JIT (Just In Time compiler), which perform translation and execution of a script language or intermediate language, a virtual machine, or the like (hereinafter, it is called a "virtual machine, or the like.") Also, extended application platform 300 itself is operated on versatile OS 230.

Extended application platform 300 is a circuit that calls standard application 120 and uses the function. Also, extended application platform 300 calls apparatus control platform 200 and uses the hardware resources. Extended application platform 300 manages and executes extended application 400. Extended application platform 300 is a program and data including the API, or the like, the service, or the like, and the virtual machine, or the like. Extended application platform 300 serves as an executing framework of extended application 400. Also, extended application platform 300 itself is operated on versatile OS 230.

Extended application 400 is a program and data of the application that performs various processing on extended application platform 300.

As explained in more detail, standard application executing part 100 has standard application 120 and standard application service I/F part (standard application service interface part) 110.

Standard application 120 is a program and data of the application that performs various processing on apparatus control platform 200. Standard application 120 acquires a user instruction and uses the various function of an image forming apparatus with the user instruction. Also, for example, standard application 120 may be an application written in intermediate language, or various script languages, or the like.

Standard application 120 may already be installed in a state of factory shipments. For example, these may be copy application 121, printer application 122, FAX application 123, and various standard application 124, or the like. Copy application 121, when the instruction of the copy by the user from operation panel part 16 are acquired, reads a manuscript by manuscript reading part 12, and performs image formation by image formation part 17. Printer applications 122, by the instruction from an external terminal, or the like, renders the file of PDL (Page Description Language,) or the like, received by network transmission and reception part 15. Printer application 122 performs image formation for the rendered data by image formation part 17. Also, printer application 122 may render the file, or the like, in the document box in memory part 19 with the instruction by the user in operation panel part 16. In this case, image formation of the rendered data is also performed by image formation part 17.

FAX application 123 acquires the instruction of the facsimile transmission by the user from operation panel part 16. Then, FAX application 123 reads a manuscript in manuscript reading part 12 and performs facsimile transmission by FAX transmission and reception part 18. Also, FAX application 123 may render the file, or the like, which is received from the external terminal and may transmit by FAX transmission and reception part 18. Also, FAX application 123 performs image formation by image formation part 17 the image data of the facsimile received by FAX transmission and reception part 18. Also, FAX application 123 may memorize the received image data of the facsimile in the document box in memory part 19. Various standard applications 124 includes after-mentioned transmission application, or the like. The transmission application transmits the image data, or the like, via network transmission and reception part 15.

Standard application service I/F part 110 provides the interface for using the function of standard application 120 from outside of standard application executing part 100. Standard application service I/F part 110 may be provided as classes of Java (registered trademark) or the like, an interface on Java language, a routine, a function, a header file, an object, a library, or the like, for example. Also, standard application service I/F part 110 may be provided as service on versatile OS 230, or the like. Also, standard application service I/F part 110 may provide a different interface for each standard application 120. Also, standard application service I/F part 110 can perform execution, installation, change setup, deletion, or the like, for standard application 120.

Apparatus control platform 200 has platform service I/F part (platform service interface part) 210, each part controlling service 220, and versatile OS 230.

Platform service I/F part 210 provides the interface for using the hardware resources from outside of apparatus control platform 200. Platform service I/F part 210 calls each part controlling service 220 and makes use the hardware resources for each part of image forming apparatus 1. Platform service I/F part 210 may be provided as service on versatile OSs 230, such as API, or the like, for example. Also, platform service I/F part 210 may be provided as a structure of C language, a class of C++ language, other objects, a routine, a function, a header file, an object file, a library, or the like (hereinafter, it is called a "class, or the like.") Also, platform service I/F part 210 may be provided with intermediate language file of Java, or the like, for example.

Each part controlling service 220 is service, or the like, which controls each part corresponding to the function of image forming apparatus 1 by a suitable method. Each part controlling service 220 operates, for example, image processing part 11, operation panel part 16, and network transmission and reception part 15, or the like, as corresponded to the call from platform service I/F part 210. Also, each part controlling service 220 can call a copy function, a network scanning function, a document box function, or the like. Also, each part controlling service 220 may be combined with different services, or the like, API, or the like, a class, or the like, according to a product line and may be included in the firmware.

Versatile OS 230 controls each part of image forming apparatus 1. As versatile OS 230, a common OS for versatile use, a versatile OS for embedded use, a real-time versatile OS, or the like, can be used, for example. Also, kernel, a core, or the like, for versatile OS 230 may be included in firmware. The kernel, a core, or the like, are programs, data, or the like, which performs schedule management and manages basic hardware. Also, versatile OS 230 can add control programs, such as a device driver and a script, separately. The device driver may be made in a language considering performance as important. The language may be C language, C++ language, assembler language, or the like, for example.

Extended application platform 300 includes standard function service 310, extended function service 320, versatile-OS installation service 330 (operating system installation service), and extended application management part 340 (extended application management part).

Standard function service 310 is service, or the like, which makes use the function of standard application 120 corresponding to standard application service I/F part 110. Standard function service 310 receives the call that specifies each function of respective standard application 120 from extended application 400. Standard function service 310 transmits the respective call to standard application service I/F part 110. Then, standard function service 310 executes the respective function of the respective standard application 120.

Extended function service 320 is service, or the like, which makes use the hardware resources corresponding to platform service I/F part 210. Extended function service 320 receives the call that specifies the function of each part of image forming apparatus 1 from extended application 400. Extended function service 320 transmits the respective call to platform service I/F part 210. Then, extended function service 320 executes the respective function of respective part.

Extended application management part 340 manages and executes extended application 400 that can call standard function service 310 and extended function service 320. Extended application management part 340 manages installation, activation, execution, stop execution, uninstallation, or the like, for extended application 400 (Hereinafter, these processes are called management of "life cycle" for extended application 400.)

Activation is a process to change to an usable state from image forming apparatus 1. Also, extended application management part 340 performs these managements by API of extended application platform 300. Also, extended application management part 340 may perform activation of extended application 400 when the certification information is acquired from operation panel part 16, or the like. Thereby, extended application 400 is also be in the usable state.

Versatile-OS installation service 330 is service, or the like, for adding a function to versatile OS 230. Versatile-OS installation service 330 installs control programs, such as a device driver and a script, on versatile OS 230. In this case, versatile-OS installation service 330 may not change the firmware memorized in the non-transitory recording medium but may make an additional change. Further, versatile-OS installation service 330 can also change contents of a configuration file of versatile OS 230. Therefore, for example, versatile-OS installation service 330 may make, change, or erase a file memorized in a directory, such as "var." Also, versatile-OS installation service 330 may change a database of a registry, or the like. In addition, versatile-OS installation service 330 can change or update a part or a whole of firmware.

Extended application 400 is the program and data of application executed on extended application platform 300. Extended application 400 can call standard function service 310 and can execute the process of using the function of standard application 120. Also, extended application 400 can call extended function service 320 and can execute the process by using the function of each part in image forming apparatus 1. Also, extended application 400 can call versatile-OS installation service 330 and can execute the process of installing the additional function to versatile OS 230. Therefore, extended application 400 makes possible to perform various processing that cannot be used in image forming apparatus 1 itself. Also, extended application 400 may be configured as included an executable file and various data. The executable file operates on extended application platform 300. Also, various data includes class information, or the like. In this case, the executable file of extended application 400 may be a binary file of an application, for example. The binary file is a file of various script languages, a file of the intermediate language for an application, a "native" executable file, or the like. In case that there is little restriction of resources, such as a process speed and memory-requirements capacity, extended application 400 may be a file of a script language or a file of intermediate language. In case that there is restriction of a resource, extended application 400 may be written in C language, C++ language, assembler language, or the like, which are excellent in performance. In addition, extended application 400 may include needed data.

Extended application 400 includes, for example, a practical use applications, such a OCR (Optical Character Recognition,) a monitoring camera application, a watermark generation, a bill generation, staff register management, slip management, contract management, card management, a PDF generation, book management, and group management. Also, extended application 400 may be an installer application that addition or change of a device driver, firmware, or the like, on versatile OS 230. Also, extended applications 400 may be other management applications, or the like. Also, a plurality of extended applications 400 may be equipped. Also, extended application 400 may be installed from image forming apparatus 1, other terminals, or the like, and may be memorized in memory part 19. Also, extended application 400 may be memorized in the external recording medium. Also, extended application 400 may be selected executable or not as corresponded to model peculiar information of image forming apparatus 1. Also, when each extended application 400 is installed or executed, "Activation" may be needed. By the activation, the respective extended application 400 is associated with respective image forming apparatus 1 and changes into a usable state. In addition, respective extended application 400 may be installed for each model of image forming apparatus 1.

In addition, each part as shown in FIG. 2 can be realized by reading the control program memorized in memory part 19 and executed by control part 10. Also, each part as shown in FIG. 2 can be access and control each part, which is hardware resources as shown in FIG. 1. Also, each part can perform reading and writing, transmission and reception, or the like, for various data.

[The Detailed Configuration of Standard Application 120, Platform Service I/F Part 210, and Each Part Controlling Service 220]

Figure 3:
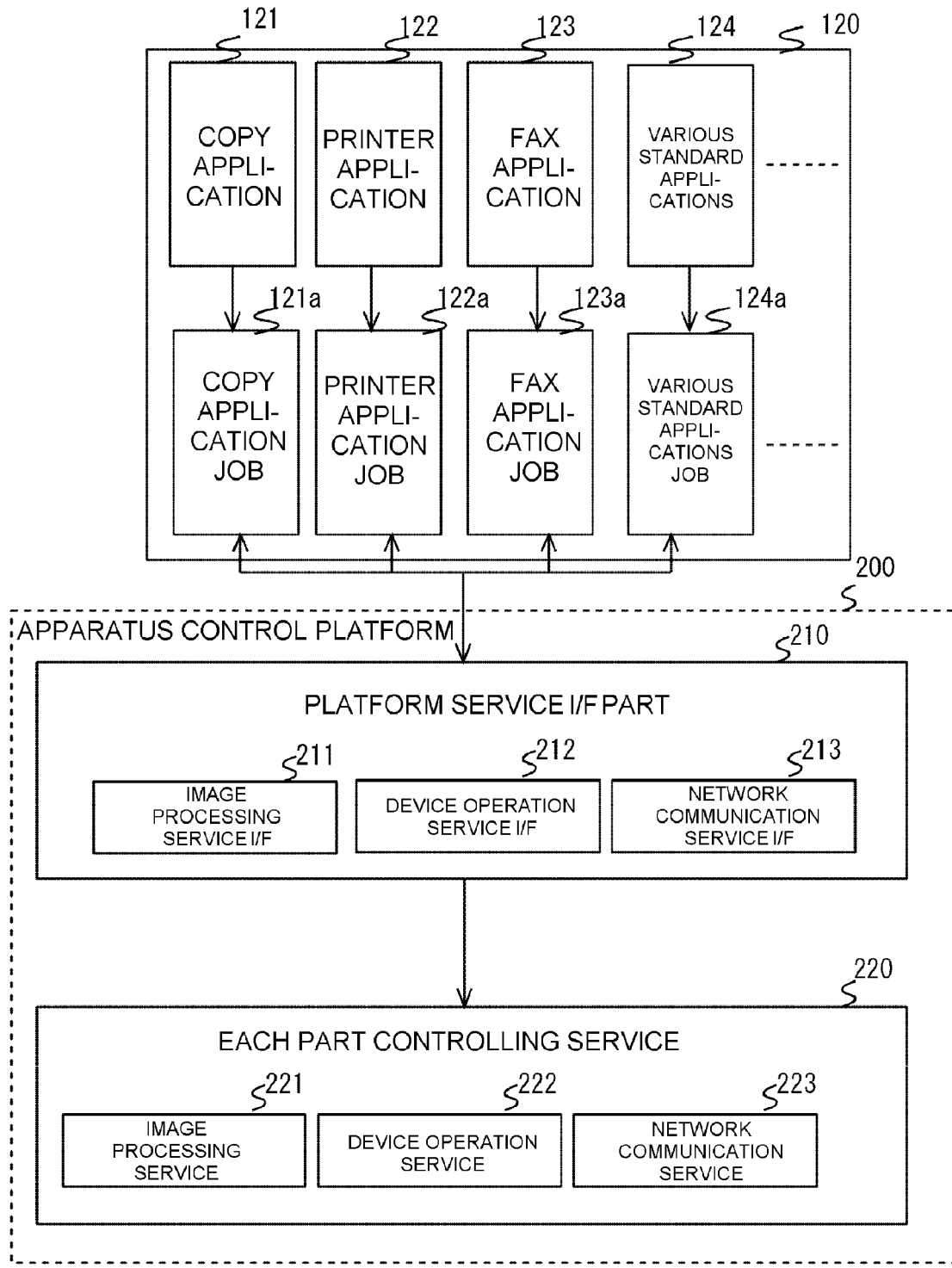
FIG. 3 illustrates the detailed configuration of a standard application, a platform service I/F part, and each part controlling service shown in FIG. 2.

Then, referring to FIG. 3, the detailed configuration of standard application 120, platform service I/F part 210, and each part controlling service 220 is described. Standard application 120 includes copy application 121, printer application 122, FAX application 123, and various standard application 124, or the like, as mentioned above. Standard application 120 provides the job that shows a request according to the instruction by the user from operation panel part 16. These jobs are copy application job 121a, printer application job 122a, and FAX application job 123a, various normal application job 124a, or the like.

Platform service I/F part 210 of apparatus control platform 200 calls each part of image forming apparatus 1 by each part controlling service 220. Thereby, platform service I/F part 210 makes hardware resources use. Therefore, platform service I/F part 210 has standard application 120 and the interface, respectively. The interface corresponds to each available function from extended function service 320.

Explaining in detail, for example, platform service I/F part 210 includes image processing service I/F 211, device operation service I/F 212, and network communication service I/F 213, as an interface. Each interface corresponds to each function used from standard application 120 or extended function service 320, for example. Image processing service I/F 211 is an interface corresponding to function of apparatus control platform 200 about generation, conversion, and output of the data of image processing. Device operation service I/F 212 is an interface corresponding to function of apparatus control platform 200 about controlling a device in each part. Network communication service I/F 213 is an interface corresponding to function of apparatus control platform 200 about network transmission and reception.

In addition, in platform service I/F part 210, image processing service I/F 211, device operation service I/F 212, and network communication service I/F 213 do not need to cooperate, respectively. Therefore, in each part controlling service 220, image processing service 221, device operation service 222, and network communication service 223 may be called, independently, as described later. That is, for copy application job 121a of copy application 121 as mentioned above, for example, image processing service I/F 211 calls the after-mentioned image processing service 221 and device operation service 222. These details are described later. Also, image processing service I/F 211, device operation service I/F 212, and network communication service I/F 213 in platform service I/F part 210 are independent, without cooperating, respectively. Therefore, for example, when it is necessary to add (extension) to function for copy application 121, printer application 122, FAX application 123, various standard application 124, or the like, either of corresponding image processing service I/F 211, device operation service I/F 212, or network communication service I/F 213 is changed. Thereby, correspondence to the addition (extension) of a function can be done.

Each part controlling service 220 includes image processing service 221, device operation service 222, and network communication service 223.

Image processing service 221 provides service about generation, conversion, and output of the data of image processing. For example, image processing service 221 makes memory part 19 memorize the image data, which is read the manuscript by manuscript reading part 12 set up resolution, a color, or the like. Also, for example, image processing service 221 performs image processing of the image data and document data in memory part 19 to image processing part 11. Also, image processing service 221 renders the image data, which is performed image formation by image formation part 17, from the file, or the like.

Device operation service 222 provides the service, or the like, for controlling the device of each part. Device operation service 222 memorizes the image data acquired from manuscript reading part 12 to memory part 19, for example.

Also, device operation service 222 renders an image on a browser displayed on the display part of operation panel part 16. Also, device operation service 222 transmits the rendered image data to image formation part 17 and makes perform image formation. Also, device operation service 222 performs facsimile transmission of the image data memorized in memory part 19 by FAX transmission and reception part 18. Also, device operation service 222 can call each function of option equipment in image forming apparatus 1. The each function is, for example, when the finisher is present, bookbinding or a staple, or the like, when the user authentication part by using an IC card or biometrics is present, user authentication by a respective user authentication part, and when the camera is present, acquisition of a camera image, line of sight detection, or the like. Also, device operation service 222 may perform control closer to the hardware configuration of apparatus. In this case, for example, device operation service 222 may make one of the motors of a conveyance part drive. Also, device operation service 222 may perform a process to acquire the state of each part, or the like.

Network communication service 223 provides service about network transmission and reception, or the like. For example, Network communication service 223 transmits and receives the file, or the like, between other image forming apparatuses and servers, a terminal, or the like, with network transmission and reception part 15 (FIG. 1) by using various protocols, such as TCP/IP or UDP. For example, network communication service 223 can also transmit and receive the scanned image data, the file of a document box, or the like. In addition, network communication service 223 can perform transmission and reception of the image data of the facsimile transmission and reception by FAX transmission and reception part 18, when the user authentication part is present, transmission and reception of a user authentication result, and when the camera is present, transmission and reception of video image data, or the like. Also, network communication service 223 can transmit and receive the state of each part of image forming apparatus 1, the call result of the function of each part, or the like,

[Image Process by Image Forming Apparatus 1] Then, as refer to FIG. 4-FIG. 7, image process by image forming apparatus 1 related to the embodiment of the present disclosure is explained. In addition, for example, in FIG. 4 and FIG. 5, processes by the side of platform service I/F part 210 to copy application 121 in standard application 120 is explained. Also, in FIG. 6 and FIG. 7, the process by the side of platform service I/F part 210 to printer application 122 in standard application 120 is explained.

Figure 4:
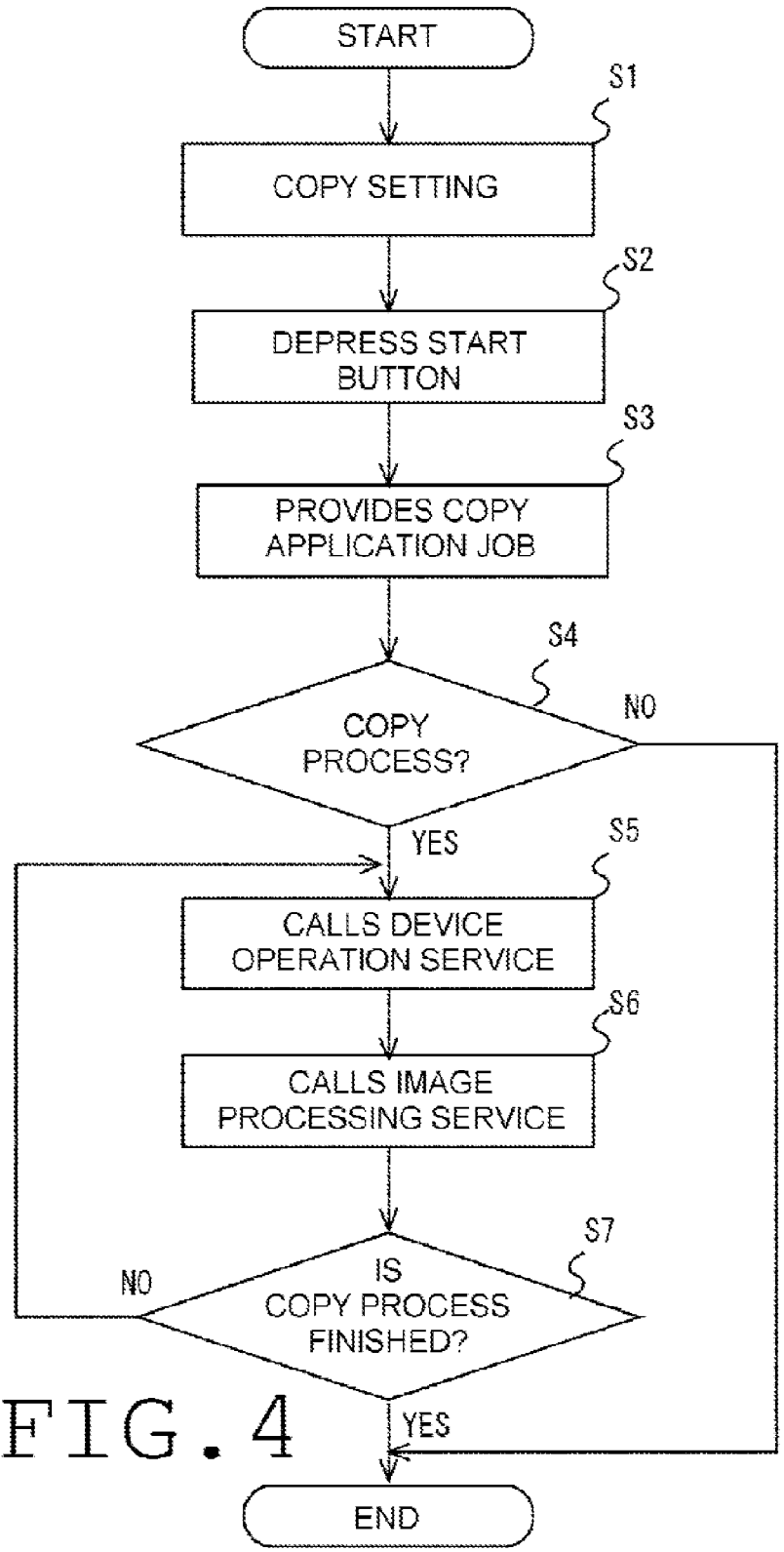
FIG. 4 illustrates a process in a side of the platform service I/F part to the copy application in the standard application in FIG. 2 and FIG. 3.
Figure 5:
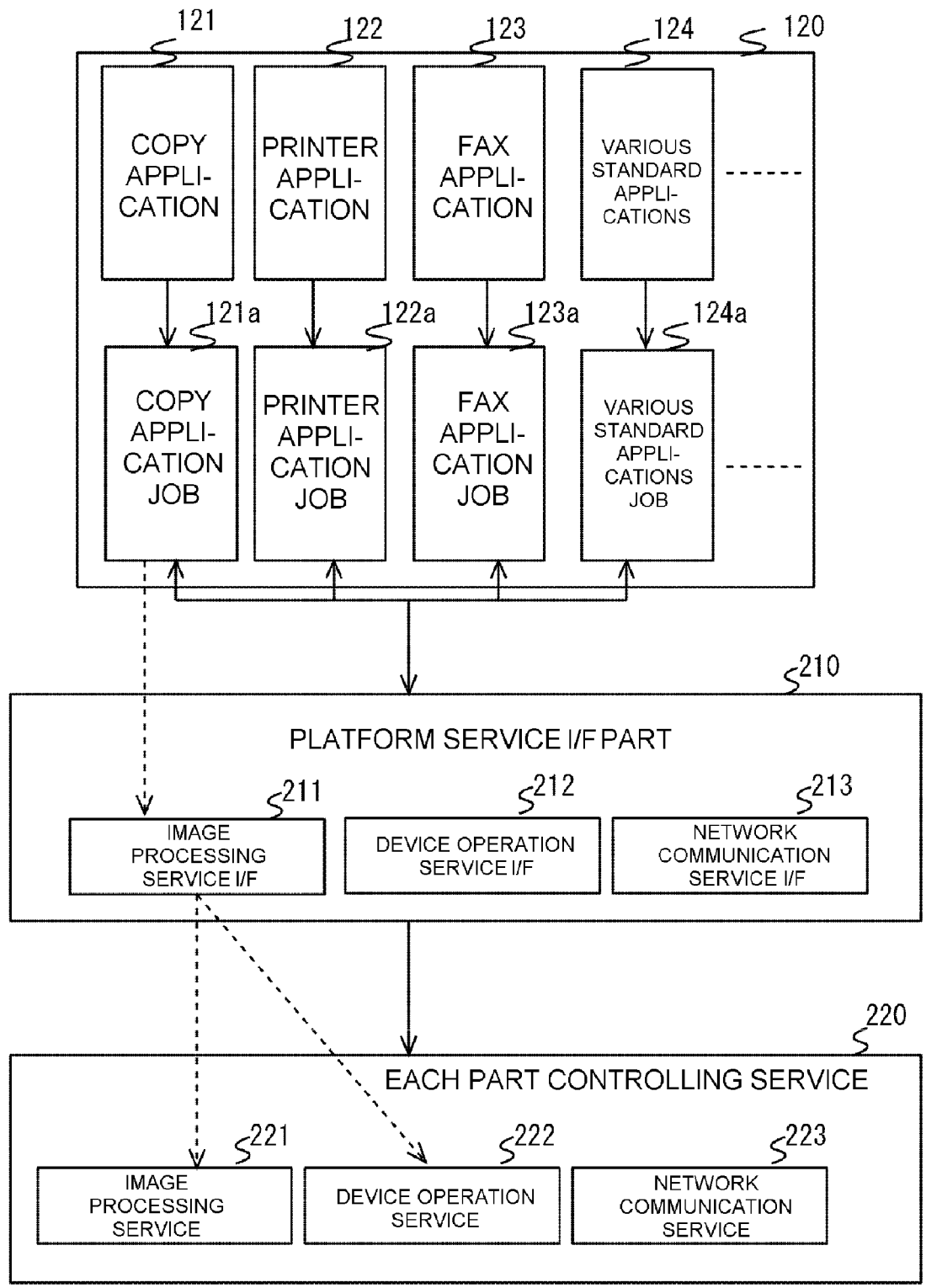
FIG. 5 illustrates a process of the platform service I/F part to the copy application in the standard application of FIG. 2 and FIG. 3.

Firstly, as shown in FIG. 4, a user sets a manuscript and performs a copy setup in operation panel part 16 (Step S1). When the start button of operation panel part 16 is depressed (Step S2), the service starts. A copy setup here is, for example, selecting a copy function in operation panel part 16, or selecting a number of copy sheets. Here, by pushing on the start button, copy application job 121a indicating the request from copy application 121 is provided (Step S3). In this case, image processing service I/F 211 of platform service I/F part 210 determines that it is copy process from copy application job 121a (Step S4: YES). Image processing service I/F 211 calls device operation service 222 and image processing service 221 (Steps S5 and S6). That is, as shown as dotted line arrow in FIG. 5, if copy application job 121a indicating the request from copy application 121 is copy process, device operation service 222 and image processing service 221 are called. In this case, as for copy application job 121a, image processing service I/F 211 does not cooperate with device operation service I/F 212 and network communication service I/F 213. If it does not determine copy process at Step S4 (Step S4: NO), a process is ended here. The reason is for determining by device operation service I/F 212 or network communication service I/F 213.

Here, reading (scan) of the manuscript by manuscript reading part 12 is started by the service in connection with control provided from device operation service 222. The image data read here is memorized by the service in connection with the control provided from device operation service 222. For example, the storage destination is in the document box in memory part 19 as mentioned above. Also, by service in connection with the control provided from image processing service 221, image formation of the image data memorized in the document box in memory part 19 is performed, and further it is printed on a recording paper. Until printing is completed, it is determined whether or not copy process is finished (Step S7: NO). After copy process is finished (Step S7: YES), device operation service 222 and the service from image processing service 221 are ended.

Figure 6:
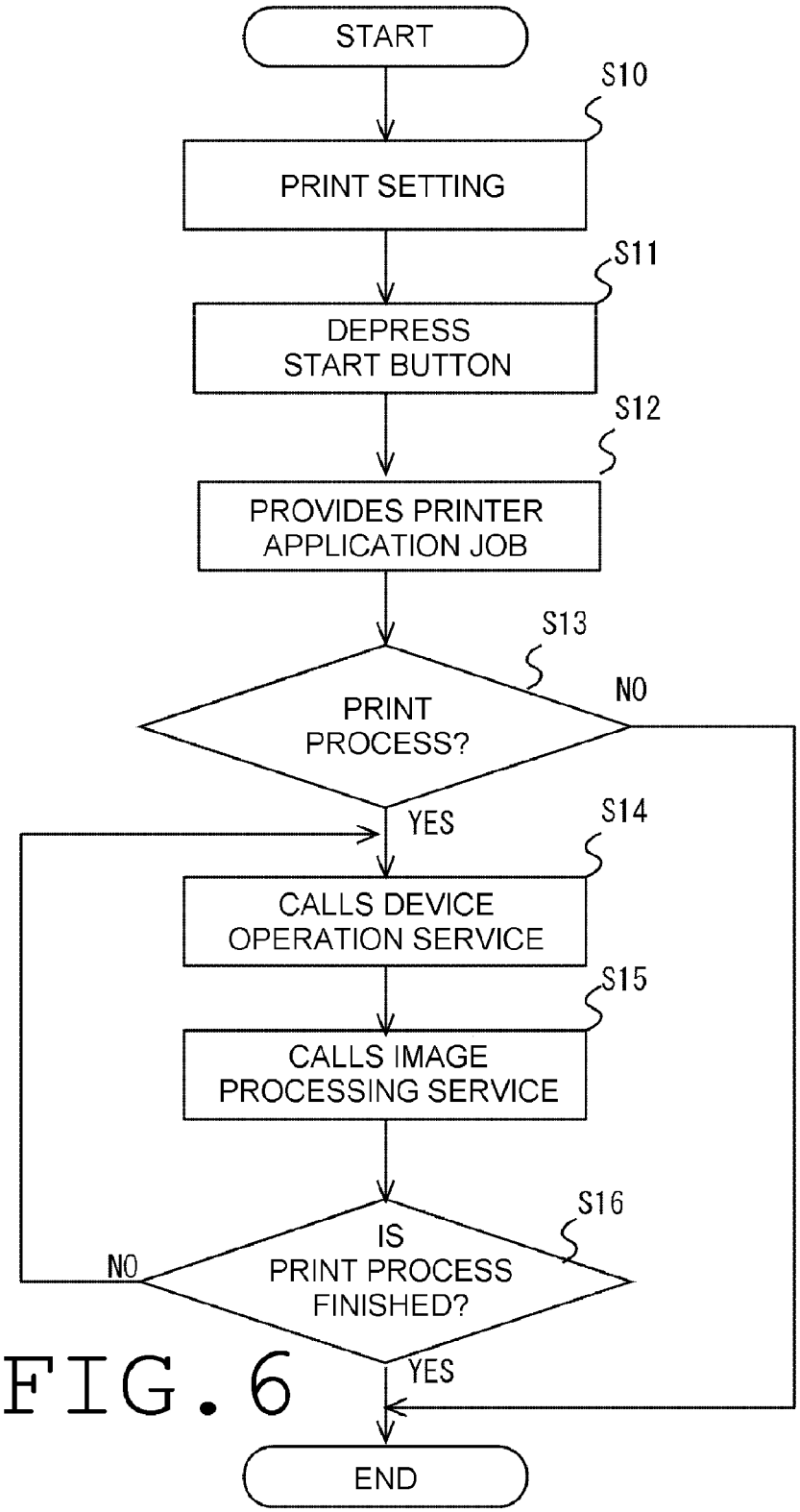
FIG. 6 illustrates a process by the side of the platform service I/F part to the printer application in the standard application in FIG. 2 and FIG. 3.
Figure 7:
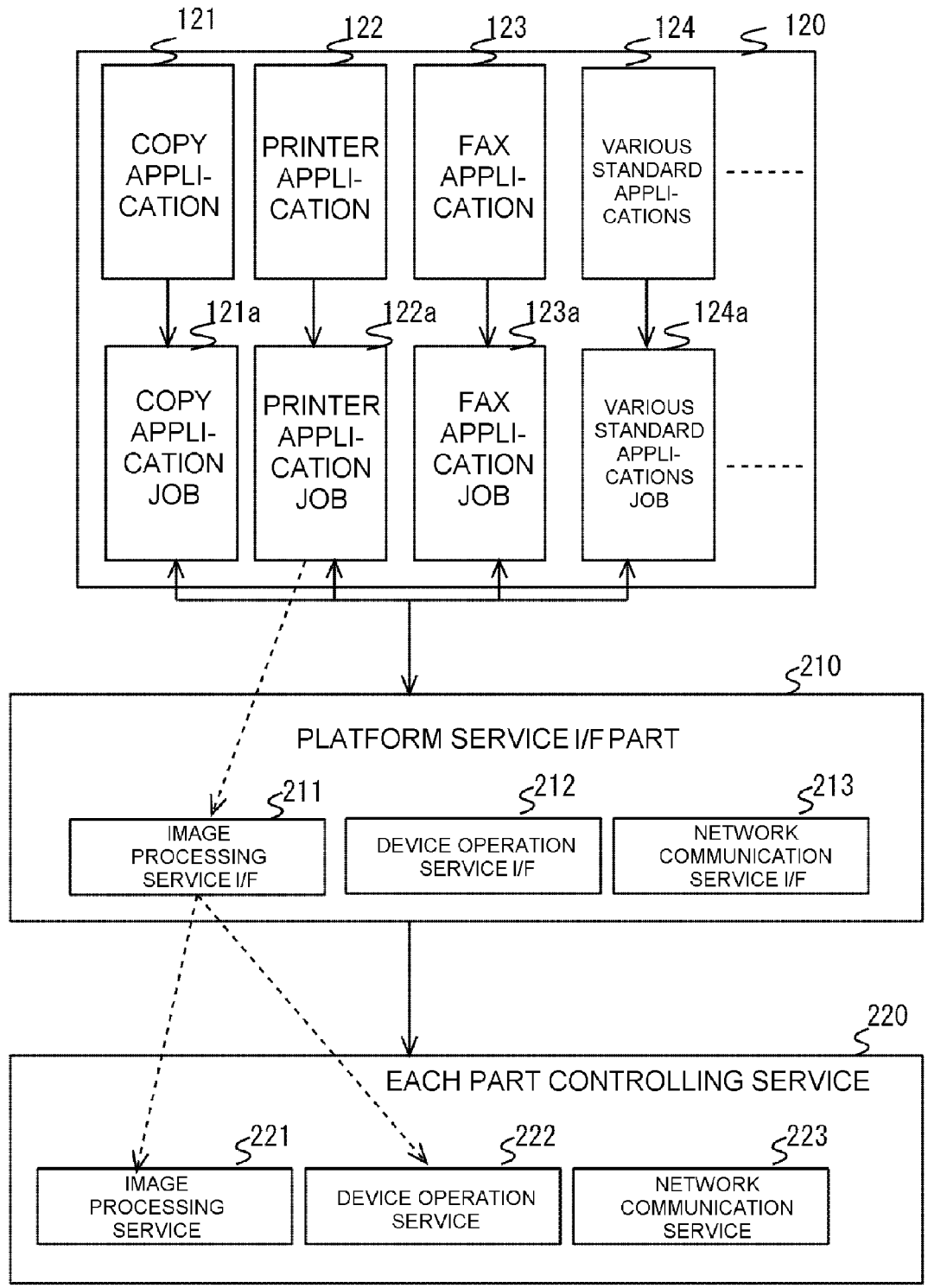
FIG. 7 illustrates a process of the platform service I/F part to the printer application in the standard application in FIG. 2 and FIG. 3.

Then, with reference to FIG. 6 and FIG. 7, the process by the side of platform service I/F part 210 to printer application 122 in standard application 120 is explained. In the following, for example, a case is explained that the image data in the document box in memory part 19 is printed on the recording paper. Firstly, as shown in FIG. 6, the user performs print setting in operation panel part 16 (Step S10). If the start button of operation panel part 16 is depressed (Step S11), the service starts. Print setting in this case is, for example, selecting the print function in operation panel part 16, or selecting the image data to be printed. Here, if the start button is pressed, printer application job 122*a*, which shows the request from printer application 122, is provided (Step S12). In this case, image processing service I/F 211 of platform service I/F part 210 determines that it is print process from printer application job 122*a* (Step S13: YES). In the case, image processing service I/F 211 calls device operation service 222 and image processing service 221 (Steps S14 and S15). That is, as shown at a dotted line arrow in FIG. 6, if printer application job 122*a* indicating the request from printer application 122 is print process, image processing service I/F 211 does not cooperate with device operation service I/F 212 and network communication service I/F 213. Then, image processing service I/F 211 calls device operation service 222 and image processing service 221. If it does not determine the print process at Step S13 (Step S13: NO), device operation service I/F 212 or network communication service I/F 213 is determined. Therefore, the process is ended here.

Here, by the service in connection with the control provided from device operation service 222, the image data memorized in the document box in memory part 19 is read. Also, by the service in connection with the control provided from image processing service 221, image formation of the image data read from the document box in memory part 19 is performed and is printed on the recording paper. Until printing is completed, it is determined whether or not print processing is ended (Step S16: NO). After print processing is ended (Step S16: YES), device operation service 222 and the service from image processing service 221 are ended.

Figure 8:
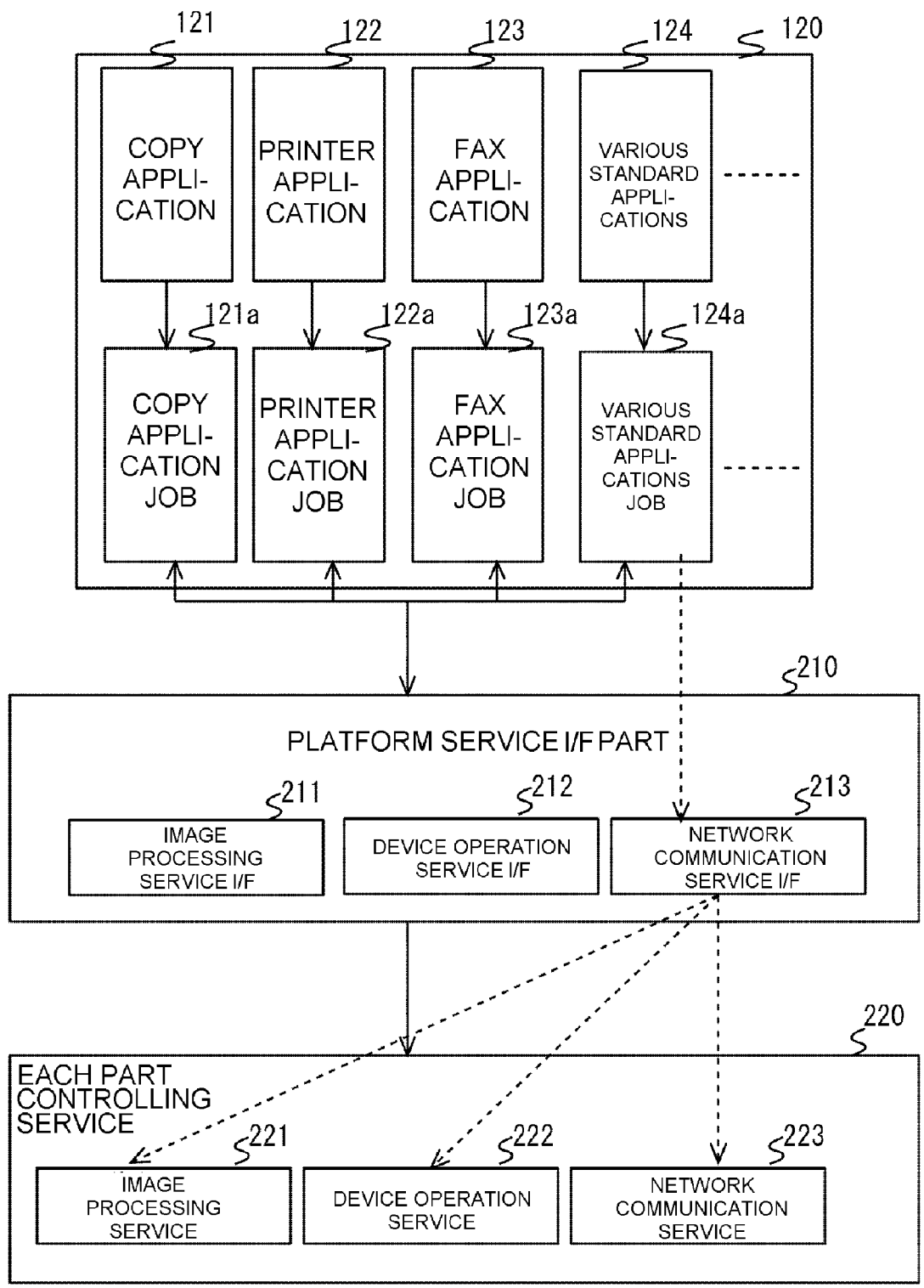
FIG. 8 illustrates a process of the platform service I/F part to the transmission application in the standard application in FIG. 2 and FIG. 3.

In addition, a case of transmitting the image data memorized in the document box in memory part 19 as mentioned above is explained. In this case, for example, a process in the side of platform service I/F part 210 corresponded to a transmission application, which is included in various standard applications 124 is as follows. That is, as shown in FIG. 8, network communication service I/F 213 of platform service I/F part 210 discriminates a transmission process from the various normal application job 124*a* of the transmission application. Then, network communication service I/F 213 calls image processing service 221, device operation service I/F 212, and network communication service I/F 213. Here, by the service in connection with the control provided from device operation service 222, the image data memorized in the document box in memory part 19 is read. Also, by the service in connection with the control provided from image processing service 221, image formation of the image data read from the document box in memory part 19 is performed. Then, by the service in connection with the control provided from network communication service I/F 213, the image data, which is performed image formation, is transmitted to destination specified by the user.

The typical architecture as mentioned above is configured as two layers, which are a platform and an application. The platform is based on application service, common system service, and a versatile OS. Also, the application uses function that a side of the platform provides. By this configuration, development of application becomes possible by using the common platform. Thereby, development efficiency can be raised.

Incidentally, in these typical image forming apparatuses, when either of applications is used, cooperation of the various modules in the side of the platform is needed. The case of a copy process by using a copy application is explained as an example. The copy job generating module of the copy application in the side of application, to an engine job execution control module of ECS (Engine Control Service) in the side of the platform, calls a job execution start function and instructs job execution. Also, engine job execution control module, to an image memory handling module of MCS (Memory Control Service) in the side of the platform, an image memory secured function is called. Accordingly, reservation of an image memory is directed.

Such cooperation of the various modules in the side of the platform is set up previously as correspond to various applications on the platform. Therefore, there is a problem, when the addition (extension) of the function of either application is needed, change of the function in the side of a whole platform is required.

As compared with this, in the present embodiment, hardware resources are managed by apparatus control platform 200 on an operating system (versatile OS 230). Also, by standard-application executing part (standard application executing part 100) the standard application (standard application 120) by using the hardware resources managed on apparatus control platform 200 is executed. Also, by the extended application management part (extended application management part 340) included in an extended application platform (extended application platform 300), the extended application (extended application 400) that can be called standard function service 310, extended function service 320 for which hardware resources are made to use, standard function service 310, and extended function service 320, respectively, which makes to use the function of the standard application (standard application 120) executed by a standard-application executing part (standard application executing part 100), is managed and executed.

Thereby, according to the image forming apparatus, image formation method, and image formation program of the present disclosure, each control service call part calls the control service providing part of each part controlling service corresponding to the request from the standard application directly. Accordingly, when the addition (extension) of the function of either of applications is needed, it only needs to change the function of the corresponding control service call part, and it enables to make unnecessary to change the function by the side of a whole platform (apparatus control platform.)

Here, apparatus control platform 200 includes the platform service interface part (platform service I/F part 210) that provides the interface for using hardware resources from outside of the apparatus control platform 200 and each part controlling service 220 having a plurality of control service providing parts (image processing service 221, device operation service 222, and network communication service 223,) which provide the service for controlling hardware resources; platform service interface part (platform service I/F part 210) has a plurality of control service call parts (image processing service I/F 211, device operation service I/F 212, and network communication service I/F 213,) which determines the request from the standard application (standard application 120,) calls the control service providing part (Image processing service 221, device operation service 222, and network communication service 223) of each part controlling service 220 corresponding to the request; and each control service call part (image processing service I/F 211, device operation service I/F 212, and network communication service I/F 213) directly-calls the control service providing part (image processing service 221, device operation service 222, and network communication service 223) of each part controlling service 220 corresponding to the request from a standard application (standard application 120.) In this way, each control service call part (image processing service I/F 211, device operation service I/F 212, and network communication service I/F 213) directly calls the control service providing part (Image processing service 221, device operation service 222, and network communication service 223) of each part controlling service 220 corresponding to the request from the standard application (standard application 120.)

In other words, image processing service I/F 211, device operation service I/F 212, and network communication service I/F 213 in platform service I/F part 210 independently calls image processing service 221, device operation service 222, and network communication service 223 in each part controlling service 220, without cooperating, respectively. Thereby, when the addition (extension) of the function for either of applications is needed, what is necessary is to change only the function of corresponding image processing service I/F 211, device operation service I/F 212, and network communication service I/F 213. That is, a change of the function by the side of a whole apparatus control platform 200 can make unnecessary. Also, image processing service I/F 211, device operation service I/F 212, and network communication service I/F 213 in platform service I/F part 210 is independent, without each cooperating. Therefore, since it becomes unnecessary to take into consideration for cooperation to each module, it becomes possible to develop apparatus control platform 200, efficiently.

Also, in the present embodiment, extended application platform 300 includes standard function service 310 that makes to use the function corresponding to standard application service I/F part 110 from standard application 120 executed by standard application executing part 100, extended function service 320 for which the hardware resources corresponding to platform I/F part service I/F 210 are made to use, and extended application management part 340 that makes and manages and executes extended application 400, which can call standard function service 310 and extended function service 320. Thereby, it becomes possible to use the function of standard application 120 or hardware resources corresponding to each part from extended application 400. Accordingly, the customization that changes a configuration according to a customer becomes easy, and it can promote reduction of development cost. That is, image forming apparatus 1 of the present embodiment can be quickly developed by a script language, or the like, in case that what is necessary is just to use the function of standard application 120. On the contrary, in case of having necessary for customization to control hardware resources directly, it becomes possible to call the function of each part without using standard application 120.

Also, in the present embodiment, it has standard application service I/F part 110 that provides the interface for using the function of standard application 120 from outside of standard application executing part 100. Thereby, it becomes easy to provide the unified-form interface between apparatus control platforms 200. Accordingly, it becomes easy to make extended application 400 in the unified development environment, and thus development cost is reducible. Also, it becomes easily executable hardware resources, which is used by apparatus control platform 200, from extended application 400. Therefore, performance, such as speed of extended application 400 at the execution time, can be raised.

In addition, in memory part 19 of image forming apparatus 1 in the present embodiment, an application, which is different type from standard application 120 or extended application 400, can also be memorized. For example, memory part 19 can be memorized Web applications other than extended application 400, or the like, (henceforth, "an external application.")

Also, memory part 19 may be memorized user data, or the like. The external application may be called by an instruction by the user in operation panel part 16 of image forming apparatus 1. In this case, the external application may be read to image forming apparatus 1 and may be executed. As configured in this way, an application of extended application platform 300 and standard application 120 can be properly used, flexibly. Accordingly, usability of the user can be received. Also, although the present embodiment explains the present disclosure in the case of applying to an image forming apparatus, it is applicable not only to this example but a variety of information processing apparatus. That is, a configuration that a network scanner, a server, or the like, separately connected to a scanner by USB, or the like, can be used. Also, it is applicable to an information processing equipment allowable to install an application, such as PC, a smart phone, a mobile phone, office equipment, industrial equipment, or the like.

What is claimed is:

1. An image forming apparatus comprising:
   a control circuit, the control circuit including
   an apparatus control platform that manages hardware resources on an operating system,
   a standard-application execution part that executes a standard application, wherein the standard application uses the hardware resources managed on the apparatus control platform, and
   an extended application platform that includes
      a standard function service for using a function of the standard application executed by the standard-application executing part,
      an extended function service for using the hardware resources, and
      an extended application management part for managing and executing an extended application to allow calling the standard function service and the extended function service, respectively, wherein the apparatus control platform includes a platform service interface part that provides an interface for using the hardware resources from outside of the apparatus control platform, and an each part controlling service that has a plurality of control service providing parts for providing service for controlling the hardware resources, wherein the platform service interface part has a plurality of control service call parts for determining a request from the standard application and for calling a specific one or more control service providing parts of the plurality of control service providing parts of the each part controlling service corresponding to the request, and wherein each of the plurality of control service call parts can call the specific one or more control service providing parts of the each part controlling service directly, and wherein each of the plurality of control service call parts operates independently without cooperating with each other;

wherein one of the plurality of control service call parts corresponding to the request directly calls the specific one or more control service providing parts corresponding to the request.

2. An image formation method executed by an image forming apparatus having hardware resources, the method comprising:

managing hardware resources on an operating system by an apparatus control platform;

causing a standard-application executing part to execute a standard application that uses the hardware resources managed by the apparatus control platform;

managing and executing a standard function service to use a function of the standard application executed by the standard-application executing part, managing and executing an extended function service to use the hardware resources, and managing and executing an extended application to allow calling the standard function service and the extended function service, respectively, by an extended application management part included on an extended application platform, wherein the apparatus control platform is configured for:
providing an interface for using the hardware resources from outside of the apparatus control platform by a platform service interface part; and
providing a service for controlling the hardware resources by an each part controlling service having a plurality of control service providing parts, and wherein the platform service interface part has a plurality of control service call parts configured for:
determining a request from the standard application; and
calling a specific one or more control service providing parts of the plurality of control service providing parts of the each part controlling service corresponding to the request from the standard application, wherein
each of the plurality of control service call parts can call the specific one or more control service providing parts directly,
each of the plurality of control service call parts operates independently without cooperating with each other, and
one of the plurality of control service call parts corresponding to the request directly calls the specific one or more control service providing parts corresponding to the request.

3. A computer readable non-transitory recording medium storing an image formation program executable by a computer for controlling an image forming apparatus, the image formation program causing the computer to:

manage hardware resources on an operating system by an apparatus control platform;

cause a standard-application executing part to execute a standard application that uses the hardware resources managed on the apparatus control platform;

manage and execute a standard function service to use a function of the standard application executed by the standard-application executing part, manage and execute an extended function service to use the hardware resources, and manage and execute an extended application to allow calling the standard function service and the extended function service, respectively, by an extended application management part included on an extended application platform;

wherein the apparatus control platform is configured for:
providing an interface for using the hardware resources from outside of the apparatus control platform by a platform service interface part; and
providing a service for controlling the hardware resources by an each part controlling service having a plurality of control service providing parts, and wherein the platform service interface part has a plurality of control service call parts configured for:
determining a request from the standard application; and
calling a specific one or more control service providing parts of the plurality of control service providing parts of the each part controlling service corresponding to the request from the standard application, directly, wherein
each of the plurality of control service call parts can call the specific one or more control service providing parts directly,
each of the plurality of control service call parts operates independently without cooperating with each other, and
one of the plurality of control service call parts corresponding to the request directly calls the specific one or more control service providing parts corresponding to the request.

4. The computer readable non-transitory recording medium of claim 3, wherein:

the plurality of control service call parts include an image processing service call part that is an interface corresponding to a function of an apparatus control platform related to image processing;

the plurality of control service providing parts include:
an image processing service providing part that provides a service related to image processing; and
a device operation service providing part that provides a service for controlling a device of each part; and the image processing service call part calls the image processing service providing part and the device operation service providing part if it is determined that the request is a copy process from a copy application.

5. The computer readable non-transitory recording medium of claim 3, wherein:

the plurality of control service call parts include a network communication service call part that is an interface corresponding to a function of the apparatus control platform related to transmission and reception;

the plurality of control service providing parts include:
   an image processing service providing part that provides a service related to image processing;
   a device operation service providing part that provides a service to control a device of each part; and
   a network communication service providing part that provides a service related to transmission and reception via network; and the network communication service call part calls the image processing service providing part and the device operation service providing part if it is determined that the request is a transmission process from a transmission application.

6. The computer readable non-transitory recording medium of claim 3, wherein the specific one or more control service providing parts is a specific plurality of control service providing parts.

7. The image forming apparatus of claim 1, wherein:
the plurality of control service call parts include an image processing service call part that is an interface corresponding to a function of an apparatus control platform related to image processing;
the plurality of control service providing parts include:
   an image processing service providing part that provides a service related to image processing; and
   a device operation service providing part that provides a service for controlling a device of each part; and
the image processing service call part calls the image processing service providing part and the device operation service providing part if it is determined that the request is a copy process from a copy application.

8. The image forming apparatus of claim 1, wherein
the plurality of control service call parts include a network communication service call part that is an interface corresponding to a function of the apparatus control platform related to transmission and reception;
the plurality of control service providing parts include:
   an image processing service providing part that provides a service related to image processing;
   a device operation service providing part that provides a service to control a device of each part; and
   a network communication service providing part that provides a service related to transmission and reception via network; and
the network communication service call part calls the image processing service providing part and the device operation service providing part if it is determined that the request is a transmission process from a transmission application.

9. The image forming apparatus of claim 1, wherein the specific one or more control service providing parts is a specific plurality of control service providing parts.

10. The image formation method of claim 2, wherein:
the plurality of control service call parts include an image processing service call part that is an interface corresponding to a function of an apparatus control platform related to image processing;
the plurality of control service providing parts include:
   an image processing service providing part that provides a service related to image processing; and
   a device operation service providing part that provides a service for controlling a device of each part; and
the image processing service call part calls the image processing service providing part and the device operation service providing part if it is determined that the request is a copy process from a copy application.

11. The image formation method of claim 2, wherein:
the plurality of control service call parts include a network communication service call part that is an interface corresponding to a function of the apparatus control platform related to transmission and reception;
the plurality of control service providing parts include:
   an image processing service providing part that provides a service related to image processing;
   a device operation service providing part that provides a service to control a device of each part; and
   a network communication service providing part that provides a service related to transmission and reception via network; and
the network communication service call part calls the image processing service providing part and the device operation service providing part if it is determined that the request is a transmission process from a transmission application.

12. The image formation method of claim 2, wherein the specific one or more control service providing parts is a specific plurality of control service providing parts.

* * * * *